United States Patent
Izsak

(10) Patent No.: US 11,593,856 B2
(45) Date of Patent: Feb. 28, 2023

(54) CROWD-BASED PRODUCT RECOMMENDATION SYSTEM

(71) Applicant: CONSUMER LEDGER, INC., Dover, DE (US)

(72) Inventor: Ran Izsak, Yokneam (IL)

(*) Notice: Subject to any disclaimer, the term of this patent is extended or adjusted under 35 U.S.C. 154(b) by 0 days.

(21) Appl. No.: 17/000,574

(22) Filed: Aug. 24, 2020

(65) Prior Publication Data

US 2021/0056612 A1 Feb. 25, 2021

Related U.S. Application Data

(60) Provisional application No. 62/890,593, filed on Aug. 22, 2019.

(51) Int. Cl.
| | |
|---|---|
| *G06Q 30/06* | (2012.01) |
| *G06Q 30/02* | (2012.01) |
| *G06F 16/2457* | (2019.01) |
| *G06F 16/248* | (2019.01) |
| *G06Q 30/0601* | (2023.01) |
| *G06Q 30/0251* | (2023.01) |
| *G06Q 30/0282* | (2023.01) |

(52) U.S. Cl.
CPC ....... *G06Q 30/0623* (2013.01); *G06F 16/248* (2019.01); *G06F 16/24578* (2019.01); *G06Q 30/0261* (2013.01); *G06Q 30/0282* (2013.01); *G06Q 30/0631* (2013.01); *G06Q 30/0639* (2013.01)

(58) Field of Classification Search
CPC ..................................... G06Q 30/0601–0645
See application file for complete search history.

(56) References Cited

U.S. PATENT DOCUMENTS

| | | | | |
|---|---|---|---|---|
| 8,051,079 B2* | 11/2011 | Cheng | ............... | G06Q 30/0603 |
| | | | | 707/708 |
| 8,494,983 B2* | 7/2013 | Wang | ................. | G06V 10/7753 |
| | | | | 706/12 |
| 11,068,917 B2* | 7/2021 | Samarev | ............... | G06V 10/40 |
| 11,354,349 B1* | 6/2022 | Xu | ....................... | G06F 16/248 |

(Continued)

FOREIGN PATENT DOCUMENTS

WO WO-2014005190 A2 * 1/2014 ............. G06Q 30/06

OTHER PUBLICATIONS

Chung, S.H. et al., "The Impact of Images on User Clicks in Product Search," Proceedings of the ACM SIGKDD International Conference on Knowledge Discovery and Data Mining: 25-33. Association for Computing Machinery. Sep. 17, 2012. (Year: 2012).*

(Continued)

*Primary Examiner* — Nicholas D Rosen
(74) *Attorney, Agent, or Firm* — Alphapatent Associates, Ltd; Daniel J. Swirsky

(57) ABSTRACT

Providing a recommendation for a specific item of interest using a recommendation system, by obtaining information concerning items of interest offered by multiple business places, receiving a query concerning the specific item of interest from an electronic device, obtaining objective information concerning business places offering the specific item of interest, and outputting one or more business places that offer the specific item of interest based on a function, said function receiving the objective information as input.

13 Claims, 3 Drawing Sheets

(56) References Cited

U.S. PATENT DOCUMENTS

| | | | | |
|---|---|---|---|---|
| 2008/0154898 A1* | 6/2008 | Cheng | ................ | G06Q 30/0603 |
| 2011/0251788 A1* | 10/2011 | Yarvis | .................. | G01C 21/343 |
| | | | | 701/533 |
| 2012/0084323 A1* | 4/2012 | Epshtein | ............. | G06F 16/9537 |
| | | | | 707/776 |
| 2012/0123976 A1* | 5/2012 | Wang | ................... | G06K 9/6259 |
| | | | | 707/723 |
| 2018/0247122 A1* | 8/2018 | Dong | ........................ | G06T 7/74 |
| 2020/0184495 A1* | 6/2020 | Samarev | ............... | G10L 15/083 |

OTHER PUBLICATIONS

Da Silva, S.F., et al., "Findings on ranking evaluation functions for feature weighting in image retrieval," Journal of the Brazilian Computer Society, 20.1: 1-10, Springer Nature B.V. (Mar. 2014) (Year: 2014).*

* cited by examiner

CROWD-BASED PRODUCT RECOMMENDATION SYSTEM

FIELD

The invention generally relates to systems and methods for gathering, generating, communicating, and processing information about items of interest.

BACKGROUND

A content discovery platform is an implemented software recommendation platform which uses recommendation system. A recommendation system is a system that tries to predict the "rating," or "score" a user would give to an item and using the predicted score the system recommends items that are more similar to the users' preferences.

The recommendation system stores information about a plurality of items, such as goods or services and the user's opinion or feedbacks about the items. The items of interest are stored in the database of the system, and each item is associated with all metadata created by a user about the item. The user metadata may include the user's subjective opinion of the item, the time of review, and more.

SUMMARY

In one aspect of the invention a method is provided for providing a recommendation for a specific item of interest using a recommendation system, the method including obtaining information concerning items of interest offered by multiple business places, receiving a query concerning the specific item of interest from an electronic device, obtaining objective information concerning business places offering the specific item of interest, outputting a one or more business places that offer the specific item of interest based on a function, the function receives the objective information as input, sending the one or more business places to the electronic device.

In other aspects of the invention, the method further includes obtaining a location of interest wherein the function receives as input distances between the business places offering the specific item of interest and the location of interest.

In other aspects of the invention, sending the one or more business places located within a specific distance from the location of interest. In other aspects of the invention, the location of interest is the location of the electronic device when sending the query. In other aspects of the invention, the location of interest is inputted by a user pointing on a map displayed on the electronic device.

In other aspects of the invention, the subjective information includes images of the specific item of interest in one or more of the business places offering the specific item of interest, and further includes sending the images of the specific item of interest to the electronic device.

In other aspects of the invention, the images are associated with capturing locations in which the images were captured, such capturing locations are used to match a business place with the image.

In other aspects of the invention, the image includes metadata of the specific item of interest in a specific business place offering the specific item of interest, wherein the method includes extracting text representing the metadata and wherein the function receives as input the metadata associated with the specific business place offering the specific item of interest.

In other aspects of the invention, the method further includes extracting a size of the item of interest from the images and inputting the size of the item of interest into the function.

In other aspects of the invention, the query includes multiple items of interest, and wherein the function receives as input the number of items of interest offered by the business places.

In other aspects of the invention, the method further includes receiving from the computerized device a subjective preference concerning the item of interest and inputting the subjective preference into the function, such that the business places are ranked based on the subjective preference.

In other aspects of the invention, the method further includes utilizing a similarity score used to define a similarity between the user who uploaded the query and other users that contributed subjective information and inputting the similarity score into the function.

In other aspects of the invention, the method further includes utilizing an item similarity score used to define a similarity between items stored in the system as input to the function.

In other aspects of the invention, the function receives multiple parameters as input, each of the multiple parameters is assigned a weight, wherein the weight is determined based on the user of the computerized device and environmental measurements.

In other aspects of the invention, the method further includes filtering the one or more business places that offer the specific item based on a property of the item of interest inputted by the user of the computerized device.

In other aspects of the invention, the method further includes defining the query as a group query in which the one or more business places that offer the specific item of interest is outputted to multiple users via multiple electronic devices, obtaining the locations of the multiple electronic devices, assigning a match value between the one or more business places and each of the multiple users.

In other aspects of the invention, the method further includes displaying the one or more business places on a map on the computerized device and displaying a route from the location of interest to locations of the one or more business places. Objective information, such as price of the item of interest, can also be displayed on the map. The method may also comprise displaying subjective information. The subjective information may be an average rank provided by other users of the recommendation system.

In other aspects of the invention, the method further includes receiving a property inputted into the computerized device after displaying the map including the one or more business places, filtering the one or more business places based on the property to generate a filtered list of business places, displaying a map including the filtered list of business places on the computerized device.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

The invention, in embodiments thereof, discloses a system for providing one or more business places to a user in response to a query. The query is sent via an electronic device used by the user, such as a smartphone, tablet and the like. The query refers to a specific item of interest. The specific item of interest may be a specific course in a restaurant, a specific ingredient in a source in a restaurant, a specific characteristic of the course in a restaurant, such as vegan and the like. The specific item of interest may be an activity in a gym, specific service such as barber for dogs and the like. The output of the response to the query comprises one or more business places. The one or more business places are selected from a list of business places stored in the recommendation system that performs the method. The selection is based on objective information, such as opening hours, price, whether or not they have a delivery service, distance between the business place and the computerized device from which the query was sent. The opening hours may indicate the amount of time between the recommendation system outputs the one or more business places and the time the business places close for the specific day. The user may input a property such as "only business places that are open for more than 1.5 hours" and the system will filter the business places accordingly.

The method may output the business places based on an option to send the item of interest to the user of the computerized device. For example, in case there are multiple items of interest, multiple business places may be outputted as a group, each business place of the multiple business places offers another section of the multiple items of interest, forming a cluster of business places. The cluster may be assigned a higher rank if the business places are close to each other. The cluster of business places may be utilized when there is a desire to send a delivery person to deliver the items of interest from the multiple business places.

Figure 1:
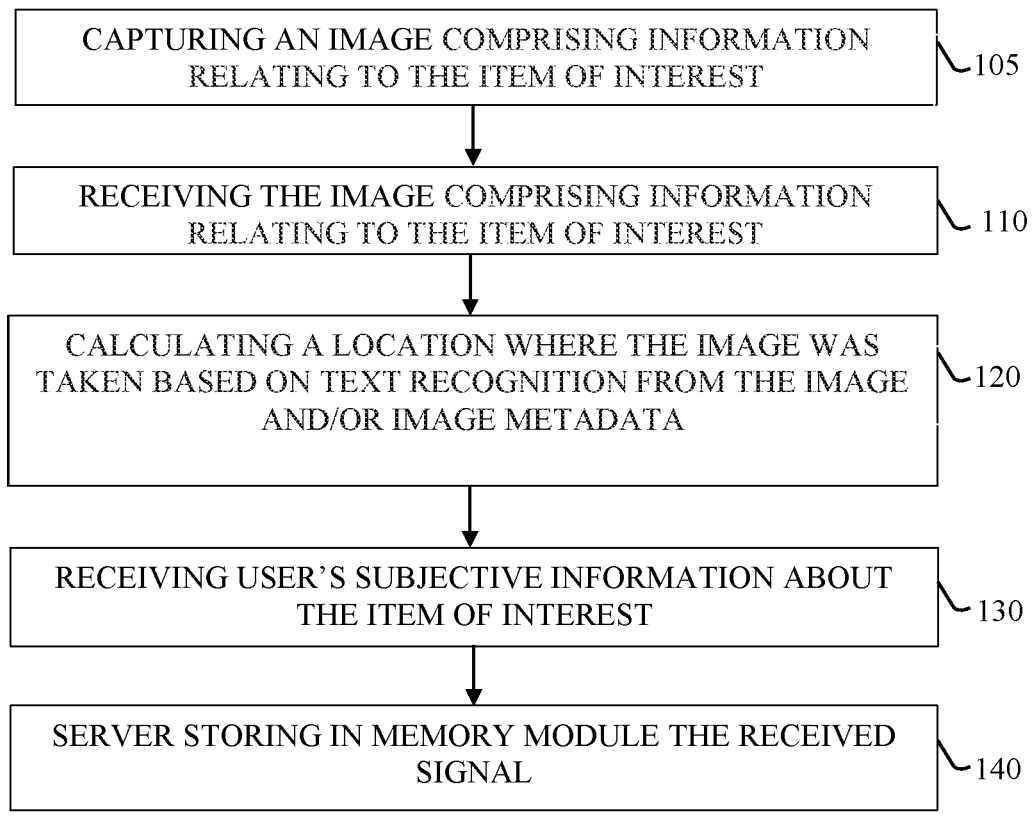
FIG. 1 shows a method of taking an image of an item of interest by a user, storing the image, image's metadata and user's subjective data about item of interest in the system, according to exemplary embodiments of the invention.

FIG. 1 shows a method of taking an image of an item of interest by a user, storing the image, image's metadata and user's subjective data about item of interest in the system, according to exemplary embodiments of the invention.

Step 105 discloses the process of taking the image comprising information relating to the item of interest by the user. The image may show more than one item, or information related to a plurality of items. The image may comprise one of more of the item of interest. The image may comprise metadata of the item of interest, such as the item's name, item's price, item's size, item's brand and the like. In such cases, the image may be taken by a camera of a smartphone, tablet, laptop, VR/AR devices, or any other device known to a person having ordinary skills in the art. The term image may refer to a still image, a video, a live video stream and the like. In such cases, an image may be a photo, a panoramic photo or any format that can be received from VR or AR devices, or any other devices known to a person having ordinary skills in the art.

Step 110 discloses receiving the image comprising information relating to the item of interest. In such cases, the image may be captured by a camera as disclosed in step 105 or may be accessed from the memory unit of the system or from an online address (URL). The users of the system may permit the system to access information included in their social network account, or other online accounts such as blogs and personal or business websites. The memory unit may be an integral part of the system, or be part of a remote device, such as an online database.

The images used by the system may be captured by the system's users or accessed by the system on an online internet address or in another device. The images may be analyzed by the system to generate a one or more recommendations in response to the user's query. The image analysis may comprise extracting features from the image, for example objects that may influence on the recommendation. Such objects may be furniture in the place of business, illumination properties, machines identified in the place of business and the like. For example, in case a coffee machine of a certain manufacturer is identified, the place of business may have a higher score.

The images comprising information relating to the item of interest may be extracted from a bank of images stored online, or from a search query.

In some exemplary cases, the image may be inputted to the processing module. In such cases, the image may be captured on another device, and the image is transmitted to the proceeding module. The image may be accessed by the processing module when stored in a memory unit in the system.

Step 120 discloses determining a location where the image was captured. In some cases, the location is extracted from the device used to capture the image. The image, as well as business rules, are loaded from the memory unit. The processing module is calculating the location where the image was taken by using the business rules loaded from the memory unit. In some cases, the business rules may be the pattern recognition techniques, such as optical character recognition (OCR). OCR is performed in order to extract text from the captured image.

The extracted text may include the name of the place where the image comprising the item of interest was taken. For example, the user captures an image of a receipt, the image of the receipt comprises the name of business place and additional information. In order to extract text from the inputted image any other techniques known to a person having ordinary skills in the art may be used.

In some exemplary cases, the location determination may be performed using a location from the GPS module in the device used to capture the image in step 105. In other cases, the location may be extracted from communication networks, for example communication beacons that detect signals from the device used to capture the image.

Step 130 discloses receiving the user's subjective information about the item of interest. The user's subjective information may be sent to another device or remain in the device used to receive the information. Sending the information may be performed by a communication module of the system, for example via Wi-Fi, Bluetooth, wired communication channels and the like. This step is optional only. The user may input the subjective information about the item of interest via an interface such as a keyboard in the user's device, a voice-assistance application or any other techniques known to a person having ordinary skills in the art may be used. The user's subjective information about the item of interest is optional only, and in some cases, price and location are sufficient in order to output the one or more items of interest based on the user's preferences, behavior, or objective standards. The multiple recommendations and/or reviews may be associated with a profile of the user who inputted the recommendations and/or reviews, the date and location of the recommendations and/or reviews and additional information. In some exemplary cases, the user's subjective information may be a rank, review, explanation about item of interest in the business place or/and any other untestable human description of the item of the interest.

Step 140 discloses storing the image captured by the user and/or the user's subjective information. The image comprising information related to the item of interest together with the user's subjective information is defined as item metadata. The item metadata may be stored in the memory unit of the system or a remote device, such as an online storage server, such as AWS.

Figure 2:
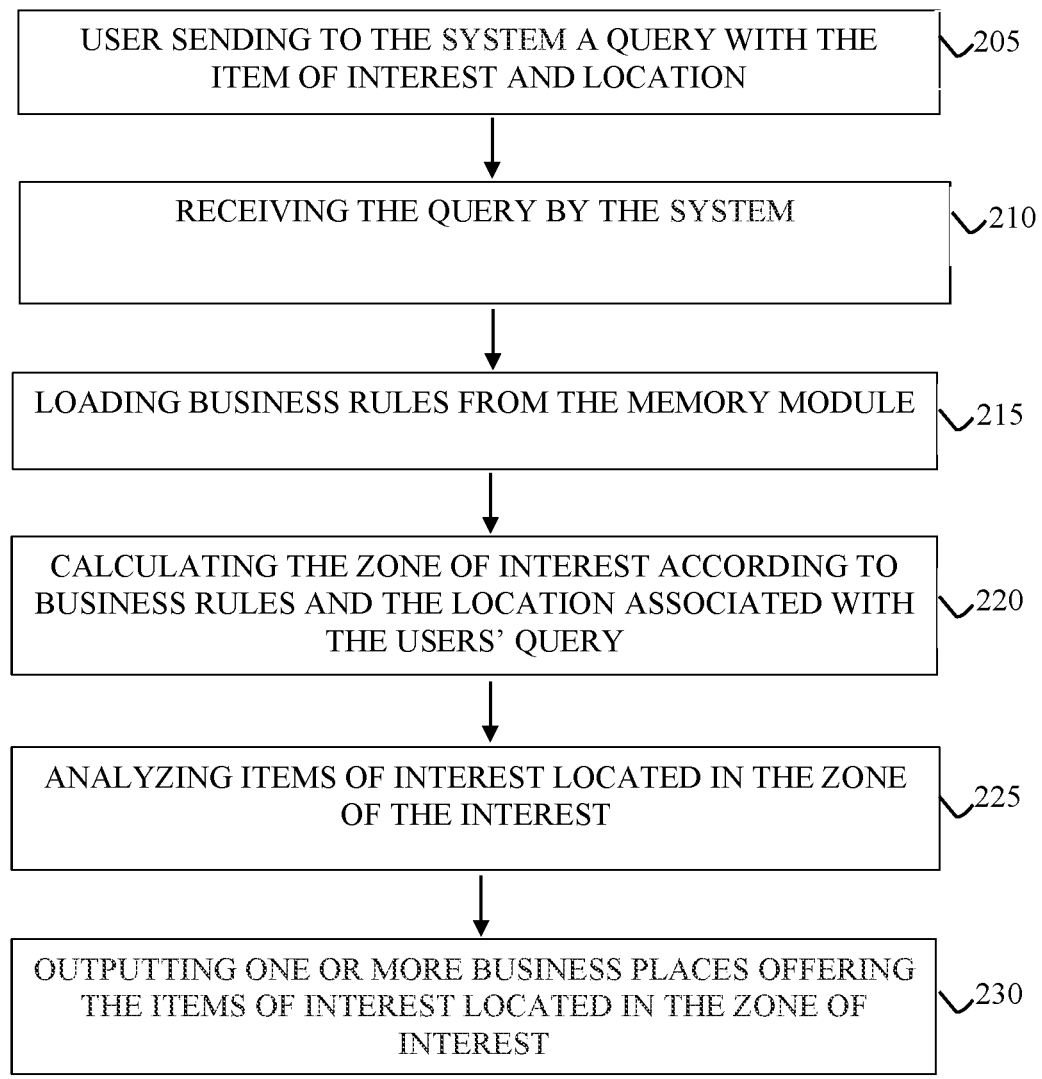
FIG. 2 shows a method of processing a user's location based query for an item of interest, according to exemplary embodiments of the invention; and, FIG. 3 shows a system for recommendation in an item recommendation system and its components, according to exemplary embodiments of the invention.

FIG. 2 shows a method of processing a user's location based query for an item of interest, according to exemplary embodiments of the invention.

Step 205 discloses sending the user's query to the system. The query may refer to goods or services, such as tour guide. The query may include one or more items that the user is interested in, for example interested in viewing, purchasing, or otherwise consuming. The query involves a request for an item of interest, or multiple items of interest. The item may be goods that may be purchased, such as garment, food, beverage and the like, or a type of business place that sells a specific item, such as a café, café with power sockets for laptops, barber shop and the like. The query may be inputted using a vocal recording of the user, text inputted by the user, video and the like.

The user sends to the system his/her location of interest and item of interest. The location of interest may be the current user's location or any another location that the user inputs as part of the query. In some cases, the user may hit a location on a map displayed on the user's device. In case the goods are displayed on a map, the user may press on an icon representing an item of interest on the map and in response, the system will display additional information, such as price and rank or the item's image. Such additional information may be provided as a layer of content, such that when closing the layer, the user returns to the map. The user may define a radius around a specific point, such as the user's device current location. The radius may be defined as a distance, such as 1200 meters, or walking/driving time as defined by a mapping service. The driving time may consider the time in the day in which the user wishes to arrive at the place of business that sells the item of interest. In some other cases, the user may input the location as text. For example, the user may input the street name and number of the building as a text via the device's interface.

In some exemplary cases, the response to the query comprises displaying a path between the user's location and the location of the business place offered by the recommendation system. The distance between the user's location and the location of the business place may be defined as the time required to arrive at the business place using public transportation, walking, driving and the like.

The sending may be performed by a communication unit of the user's device. Such sending may be performed using a wired or wireless communication. In some cases, such communication may be via telecommunications networks, such as the internet, local area network, wireless-based networks, and the like.

Step 210 discloses receiving the signal representing the user's item of interest and location of interest by the system. The signal representing the user's location may be received at a memory module of the system or accessed by the processing module of the system when stored in a memory module in the system.

Step 215 discloses loading business rules related to the item of interest and/or to the user that sent the query. The business rules may be stored at the server, at the user's device or a combination thereof.

Step 220 discloses calculating the zone of interest according to business rules and the location associated with the user's request. The zone of interest is defined as an area in which items of interest can be provided as a response to the user's query. The user information loaded from the memory unit as well as the location of interest and item of interest may be used to calculate the zone of interest.

In some cases, the zone of interest may be a disk with a center at the location of interest sent by the user in step 205. The radius of the disc may be predefined or defined by the user. For the example, the user may input his current location and look for all coffee shops in one-kilometer radius that sells a cappuccino less than one dollar or the user may query the closest coffee shop to its current location.

In some other cases, the zone of interest may be any polygon that sent by the user in step 205. A user travels from point to point and wants to drink the coffee. He hulls his route with a rectangle and asks to find the coffee shop that suits him the most.

Step 225 discloses analyzing items of interest located in the zone of the interest. The analysis may be performed on a server communicating with the device of the user who sent the query, or on the user's device, such as laptop, tablet and smartphone. The items of interest may be loaded from a memory address accessible to the system. The items of interest are processed by the system in order to determine their relevance to the query provided by the user. In some exemplary embodiments, the server assigns a rank to the items of interest based on a predefined set of rules, as elaborated below. Then, the system outputs the top-ranked results to the user's device. The number of results provided to the user's device may change based on the user's preferences, type of item and additional properties.

The analysis may be based on images received at the system. The analysis may be based on textual information and ranks received at the system. The analysis may be based on a combination of images received at the system textual information and ranks received at the system.

In case the query comprises multiple items, the output considers the match of the multiple items. For example, a single place having the multiple items may have a higher rank than a large area having all items with lower prices.

In some other cases, the system uses a function that ordering the multiple items in the zone of interest. In some embodiments of the invention, the rank calculated for each item and ordering. The function that calculate the rank of each item can take into account user subjective preference. For examples, the user asks for a recommendation for a cappuccino, the system knows that this user prefers the coffee produced from *Arabica* coffee bean than from

*Robusta* coffee bean. In this case the system will give a greater rank to the cappuccino produced from *Arabica* coffee bean.

Further, in case the user requests a recommendation for a specific type of coffee, such as Latte, the system may assign a higher rank for recommendations made for any type of coffee, such as Espresso, due to the user's profile stored in the system. The ranking function may also receive as input a value provided by the user, as to the item of interest. Such value may indicate the user's subjective preference concerning the item of interest.

The captured image may also show the product in a manner that enables to measure the product's size. For example, one place may pour more coffee in a medium-size cappuccino compared to another cafe. For example, by showing a container, plate, cup or bag that store the item of interest, or from text in the menu of the business place. This way, the recommendation may include the weight/length/volume of the item of interest. The price in the recommendation may be calculated per a measuring unit, such as per 1 Liter. The recommendations may be assigned a rank based on metadata, such as nutrition information added to the recommendation, or a nutrition value of the item of interest in the recommendation. Such information is sometimes written explicitly e.g. in a description of a product on presentation, menu, receipt and the like.

When analyzing items of interest located in the zone of the interest, the system may also estimate user's rank for an item of interest based on prior behavior of the user. The behavior may comprise prior purchases, prior feedback to items on social networks and/or other websites, exchange of messages at the user's device and the like.

The system may store a user similarity score used to define a similarity between the user who uploaded the query and other users of the system. The similarity score may be based on personal information inputted into the system by the users, prior users' behavior and the like. The similarity score may be used to analyze the items of interest. For example, in case users with a high similarity score liked an item analyzed by the system, the probability that the specific user will like the same item increases. The system may compute a collaborative filtering value for the item of interest in the user's query, for example based on other users' behavior, preferences and information detected in the users' devices. The user similarity score may be assigned for a single item, or a type of items. For example, a couple of persons have a high user similarity score concerning food, and a low similarity score concerning music.

The system may store an item similarity score used to define a similarity score between the items stored in the system. Thus, when a user liked a specific item, for example by selecting the specific item or providing a positive feedback to the specific item, the same user may have a high probability to also like an item with a high item similarity score to the specific item. Positive feedback may comprise recommendation online, purchase and the like. In some cases, the system may assign an image similarity value between two images received at the system. Such image similarity value may be used to compute the item similarity score. The image similarity value may be computed using a neural network or any other image processing technique selected by a person skilled in the art.

In some cases, the rank of a recommendation may change according to the weather, combined with the user's profile. For example, in case the user is looking for a special book located 2 Km away, and the query is sent on a rainy day, the recommendation will have a higher value compared to a pizza place located 2 Km from the user, as the book has a uniqueness value.

In some exemplary cases, a rank of the business places offering the items of interest from which the system outputs the one or more business places may be ranked based on a predefined function. The function may have one or more parameters, such as distance from user's device, price, prior recommendations, match to user's behavior and the like. In some cases, each of the parameters is assigned a value by the system. For example, the value may be in a range of 1-10, or any value higher than 0. In some cases, each parameter is assigned a weight coefficient used to calculate the score of the specific item for the user that sent the query. For example, the distance may have a weight of 7, while the item's popularity may be assigned a weight of 1.5. The weights may differ based on the user's identity, item's type, geographic location of the user, and additional properties related to the user and/or the item. The weights may be adjusted over time, for example using machine learning techniques. The function used to calculate the score of each item may be a minimum function, a maximum function, a linear function, a non-linear function, and the like. In some cases, a parameter may have a maximal value or a minimal value. For example, in case the distance is higher than 12 kilometers, the business place will be considered as irrelevant and will not be included in the one or more business places outputted in step 230.

Step 230 system outputting a one or more business places offering items of interest located in the zone of interest. The business places may be outputted as a list. The list may include a single item. The list of business places may be sorted according to value provided by a predefined function described in step 225. The list is later displayed on the device of the user who sent the query. Outputting the one or more business places may comprise displaying the one or more business places on a map, based on the locations of the business places. The outputting may comprise a price of the item, as well as additional properties, such as size, popularity rate and the like. The user that receives the one or more business places offering the items of interest located in the zone of interest may request to filter the business places, for example based on the items' size.

In some exemplary cases, multiple users may send a query that relate to all of the multiple users. This may be implemented by receiving an identifier of the query, to distinguish this case from queries that relate to a single user. The first user that sent the query may define that the request is a group query, receive an identifier from the system and send the identifier to devices of other users associated with the group query. Alternatively, the user who sent the group query may upload identifiers of the additional devices and the system will send a message to these devices, such as a mobile application notification, SMS message and the like.

When receiving a group query, the system will consider the locations of the multiple devices of the multiple users associated with the query. In some cases, the weights assigned to the locations may vary among users of the group query, based on prior behavior and preferences of the multiple users. For example, in case the system stores prior selections of the user, walking habits and the like. Similarly, the system may assign weights to other properties used to determine which items of interest are suggested to the multiple users of the group query. The group query may comprise multiple items of interest as received from multiple users associated with the group query. The system may send the same list of suggested business places to all the users' devices associated with the group query. The system may assign a match value for each of the members in the group, the match value defines the level of theoretical likelihood that a specific group member will like the item. In order to verify that all group members are pleased at a minimal degree, the system may suggest an item only in case the minimal value of all the match values for a given item for all the group members is higher or lower than a predefined threshold. The group's members may input their current location, or an expected location that relates to a future time. For example, in case the group members look for ice-cream but only 4 hours after sending the query to the system.

When outputting the business places to the group members, the system may determine the business places based on at least one of the following methods: 1. Selecting the best business place for a single member of the group, for example if the user celebrates a birthday. 2. Assign weights to the users' importance, for example based on business seniority or age. 3. Choosing a max-max function, in which the option with the highest maximal value is selected. 4. Choosing a max-min function, in which the option with the highest minimal value is selected 5. Choose an item with a minimal score that is higher than a predefined threshold. 6. Choose the item with the most similar score for all group members. 7. Choosing a Social welfare function which considers the sum of values—that is, if there is a group of n people with n valuation functions (v_i for person i), then the social welfare is simply Sigma of v_i (item/s/place with items). So, we want the overall happiness of the group to be maximized. 8. Choose any other function known to a person skilled in the art.

Figure 3:
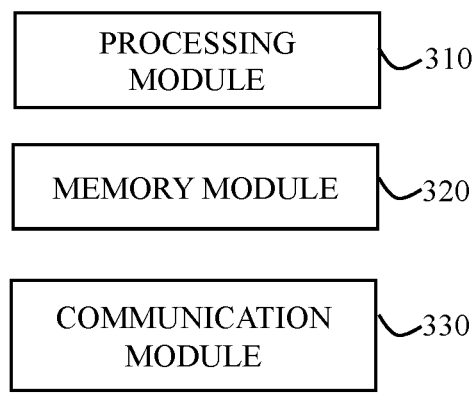

FIG. 3 shows a system for recommendation in an item recommendation system and its components, according to exemplary embodiments of the invention.

The system comprises a processing module 310. The processing module 310 is configured to process the collected user's query and to calculate zone of interest and ordering the business places located in the zone of interest. As well, the processing module 310 is configured to store user's metadata about goods. The processing module 310 is electrically coupled to a memory module 320.

The system also comprises memory module 320. The memory module 320 is configured to store user metadata associated item and the location of this item and a set of rules used by the processing module 310 to calculate the zone of interest and list of business places there are located in the zone of interest. The set of rules may be stored in executable instructions accessed by the processing module 310 when receiving a query to determine the list of business places included in the zone of interest. The system also comprises a communication module 330 configured to collect communication signals or query and send commands to the communication units associated with the user's device. The communication module 330 is electrically coupled to the processing module 310.

It should be understood that the above description is merely exemplary and that there are various embodiments of the invention that may be devised, mutatis mutandis, and that the features described in the above-described embodiments, and those not described herein, may be used separately or in any suitable combination; and the invention can be devised in accordance with embodiments not necessarily described above.

While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings without departing from the essential scope thereof. Therefore, it is intended that the invention as described herein is not limited to any particular embodiment representing the best mode contemplated for carrying out the invention.

What is claimed is:

1. A method for providing a recommendation for an item of interest using a recommendation system, said method comprising:
   receiving, at a processing module, a query from a user concerning one or more items of interest;
   using a processing module to:
      access images from a memory unit or an online address;
      detect from the images one or more images comprising the one or more items of interest by using pattern recognition algorithms to extract from the the one or more images features related to the the one or more items of interest;
      use at least one parameter of objective information connected to the one or more images, to calculate one or more scores of the one or more items of interest, the one or more scores determining relevance of the one or more items of interest to the query, wherein the objective information concerns a business place offering the one or more items of interest; and
   responsive to the query, outputting to the user the one or more images, based on the determined relevance.

2. The method of claim 1 wherein the processing module uses optical character recognition (OCR) algorithms to extract text from the one or more images.

3. The method of claim 1 wherein the parameter of objective information comprises distance from the user.

4. The method of claim 1 wherein the processing module assigns a weight coefficient to the at least one parameter of objective information and uses the weighted parameter to calculate the score of the corresponding item of interest.

5. The method of claim 4 wherein the weight coefficient is adjusted over time by using machine learning techniques.

6. The method of claim 4 wherein the weight coefficient is determined based on environmental measurements.

7. The method of claim 4 wherein the weight coefficient is determined based on a profile of the user.

8. The method of claim 1 comprising, responsive to the query, displaying at least one location of at least one business place offering the one or more items of interest.

9. The method of claim 8 comprising displaying the at least one location of the at least one business place in a list.

10. The method of claim 8 comprising displaying the at least one location of the at least one business place on a map, on a device of the user.

11. The method of claim 10 comprising outputting to the user at least one of the one or more images in response to the user pressing the at least one location on the map.

12. The method of claim 1 comprising using the processing module to extract a size of the one or more item of interest from the one or more items of interest from the one or more images and use the size to calculate the one or more scores of the one or more items of interest.

13. The method of claim 1 wherein the query is a group query which relates to multiple users, the method comprising generating a group query identifier to be used by the multiple users, the method further comprising, responsive to receiving the group query identifier from one or more of the multiple users, outputting to the one or more of the multiple users the one or more images.

\* \* \* \* \*